April 10, 1962  J. R. ELLETT  3,028,996

INJECTOR FOR PIPE CLEANING BALLS

Filed March 11, 1960

INVENTOR
James R. Ellett
BY Alex. E. MacRae
ATTORNEY

United States Patent Office 3,028,996
Patented Apr. 10, 1962

3,028,996
INJECTOR FOR PIPE CLEANING BALLS
James R. Ellett, 8119 96th Ave., Edmonton,
Alberta, Canada
Filed Mar. 11, 1960, Ser. No. 14,326
2 Claims. (Cl. 221—267)

This invention relates to an injector for balls such as are employed for pipe cleaning purposes.

The use of balls in the cleaning of pipe lines is well known. One field of general use is in the flow line through which crude oil produced by an oil well is transferred to the tank battery. In certain areas this line becomes coated on the inside with a layer of wax which is deposited by the oil. This layer becomes thicker as the oil continues to flow and sometimes plugs the flow line completely. By inserting a ball, sometimes referred to as a "pig," in the line at the well head, the oil pressure will force it through the flow line scraping out the wax ahead of it.

The facilities for inserting such balls in a pipe line are not too convenient. Moreover, the step of inserting the ball involves a step manually performed at the pipe line itself. Thus, the attention of operations personnel is required sometimes in remote areas where the attendance of personnel is not practically convenient. The operation is therefore not only time consuming to an excessive degree but, when not performed at intervals when it is practically impossible to do so, interferes with the efficient operation of the flow line.

It is an object of this invention to provide an injector for inserting balls in pipe lines and the like which is of simple construction, which may be readily and substantially instantaneously actuated to insert a ball, which may be actuated by remote control, and which requires manual attention at greatly prolonged intervals.

Figure 1:
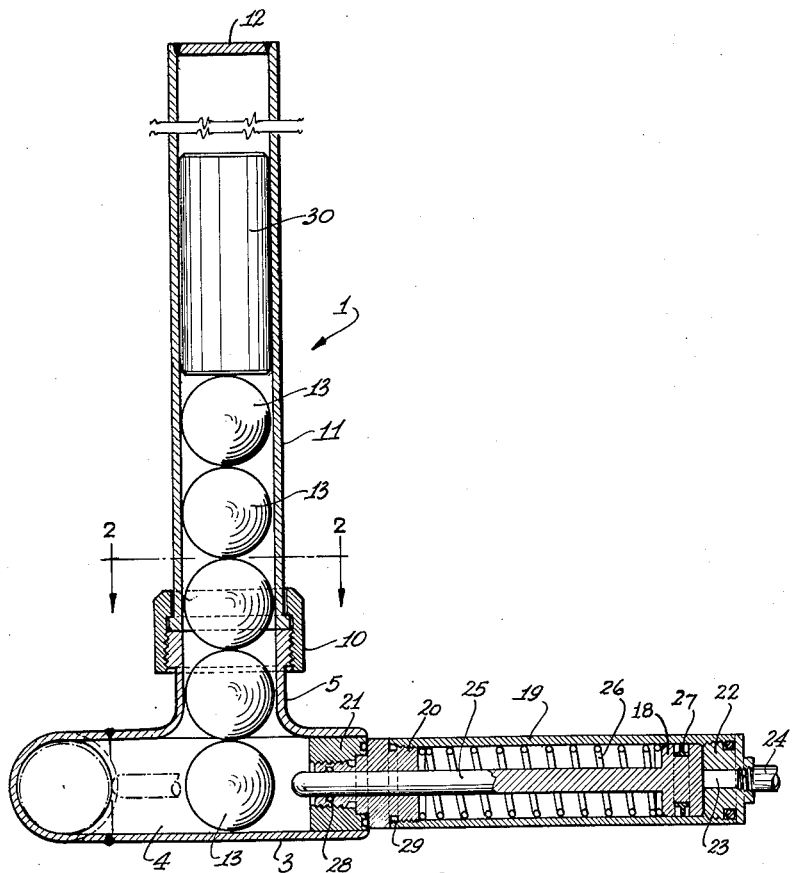
Figure 2:
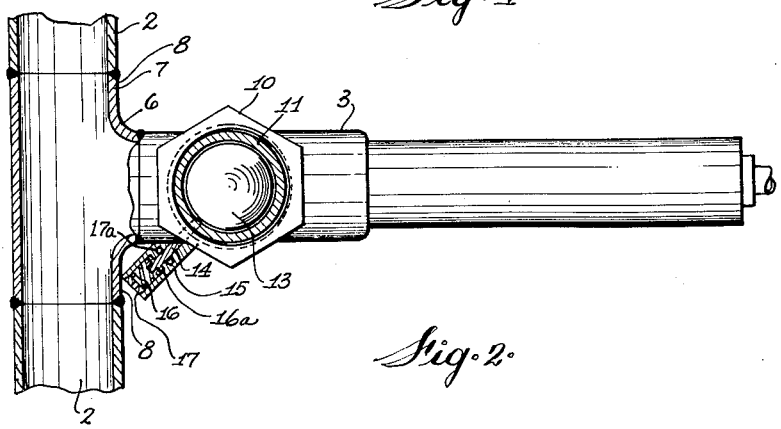

The invention will be described with reference to the accompanying drawing, in which:

FIGURE 1 is a sectional side elevation of a device in accordance with the invention, and FIGURE 2 is a sectional plan view.

The injector of the present invention is generally indicated at 1 as mounted in association with a pipe of flow line 2.

The injector comprises a standard pipe T 3 having a pipe section 4 and a T section 5. One end of the pipe section 4 is fixed to the T section 6 of a standard pipe T 7, the pipe section 8 of which is connected to the flow line 2. Connected to T section 5 as by a union fitting 10 is a tubular magazine 11 arranged for vertical disposition and provided at its free end with a closure cap 12. The magazine is arranged to contain a row or column of balls 13, the lowermost of which is disposed within the pipe section 4, as shown.

Means releasably retaining such lowermost ball 13 in the pipe section 4 comprises a finger 14 extending into pipe section 4 and having its end engaging a lower portion of ball 13, as shown in FIGURE 2. The finger is reciprocally mounted in a housing 15 fixed to the pipe section 4. A spring 16 in the housing has one end seated on an annular flange 16a carried by the finger and its other end seated on a removable closure plug 17 mounted in the free end of the housing. An O-ring 17a in housing 15 engages the finger to maintain the interior of the housing in fluid-tight condition. It will be apparent that the spring will urge the finger into engagement with the ball to retain it in place in the pipe section 4 at the base of the column of balls but that, in response to sufficient pressure on the lowermost ball to overcome the action of spring 16, the ball will depress the finger and move past the same.

Means are provided for applying pressure to the lowermost ball to move it past the retaining finger 14 and, as shown, comprises a piston 18 reciprocally mounted in a cylinder 19 mounted on the other end of pipe section 4 as by means of a threaded fitting 20 and an adapter ring 21. The outer end of cylinder 19 is provided with a fitting 22 having a passage 23 therein communicating with a gas line 24 connected to the fitting 22 for admission of gas under pressure to the cylinder on one side of piston 18. Piston 18 has a piston rod 25 extending through fitting 20 and having its free end disposed within pipe section 4 for engagement with the lowermost ball 13. A spring 26 in the cylinder urges the piston and piston rod in an outer direction and, in the absence of sufficient gas pressure on the piston, normally holds the piston in engagement with fitting 22 and the end of the piston rod in non-pressure applying relation to the lowermost ball 13.

The piston may be provided with a suitable piston ring 27. An O-ring 28 may also be provided between piston rod 25 and fitting 20 and an O-ring 29 between fitting 20 and cylinder 19.

In operation, when it is desired to insert a ball in the flow line 2, gas under pressure is admitted to the cylinder 19 through gas line 24 to move the piston 18 against the action of spring 26. The rod 25 thus moves the ball past the retaining finger 14 and into the flow line where it is entrained by the flow of oil therein. The rod 25 prevents dropping of the second ball in the column into the pipe section 4 until the rod and piston are substantially fully retracted under the influence of spring 26 when the gas pressure is released. It will be apparent that the balls in the column will thus successively and automatically fall into proper position for subsequent insertion as required into the flow line.

Preferably, a weight 30 is placed in the magazine 11 for engagement with the topmost ball in the column and to provide more positive downward feeding of the balls.

When the supply of balls in the magazine 11 are exhausted, it may be reloaded by removing the magazine by means of the union fitting 10 and subsequent replacement thereof.

The injector described provides for positive ball injection regardless of flow conditions in the flow or wax buildup therein. Moreover, the balls are restrained from entering the flow line except in response to a positively controlled actuating procedure. Only one ball can be injected during each operating cycle.

It will be observed that the injector comprises a novel arrangement of standard components and thus permits inexpensive and convenient manufacture thereof.

I claim:

1. In a pipeline, a ball injector therefor which comprises a first pipe section constituting a portion of said pipeline and in axial alignment therewith and having a second pipe section extending perpendicularly therefrom, said second pipe section having an open end communicating with said first pipe section and a fixed plug closing the other end thereof, a T section extending perpendicularly from said second section and communicating therewith, a ball-receiving tubular magazine having a union fitting removably mounting said magazine on said T section in axial communicating relation therewith, a ball feeding weight slidably mounted in said magazine, a ball retaining finger extending slidably through the wall of said second section and having an axis angularly disposed with respect to the axis of said second section, a housing for reception of said finger carried by said second section and disposed exteriorly thereof, a spring in said housing urging said finger into the interior of said second section, said finger being substantially fully retractable into said housing against the action of said spring, sealing means carried by said housing and engaging said finger to maintain the exterior of said housing in fluid-sealed relation relatively to said second section, a cylinder carried by said plug and extending axially therefrom, a piston reciprocally mounted in said cylinder and having a piston rod, said piston rod having a free end portion projecting axially into said second pipe section through said plug, a spring housed in said cylinder between said piston and said plug and urging said piston and piston rod in a direction outwardly of said second pipe section, sealing means engaging said piston rod within said plug to maintain the interior of said cylinder in fluid-sealed relation relatively to said second pipe section, and means for admitting gas under pressure to the outer end of said cylinder to reciprocate said piston and piston rod in a direction inwardly of said second pipe section, said free end portion of said piston rod being movable into underlying relation with respect to said magazine.

2. In a pipeline, a ball injector therefor which comprises a first pipe section constituting a portion of said pipeline and in axial alignment therewith and having a second pipe section extending perpendicularly therefrom, said second pipe section having an open end communicating with said first pipe section and a fixed plug closing the other end thereof, a T section extending perpendicularly from said second section and communicating therewith, a ball-receiving tubular magazine having a union fitting removably mounting said magazine on said T section in axial communicating relation therewith, a row of balls in said magazine each having a diameter substantially equal to the internal diameter of said first pipe section, a weight slidably mounted in said magazine and seated upon said row of balls to urge said balls successively into said second section, a ball retaining finger extending slidably through the wall of said second section and having an axis angularly disposed with respect to the axis of said second section, a housing for reception of said finger carried by said second section and disposed exteriorly thereof, a spring in said housing urging said finger into the interior of said second section, said finger being substantially fully retractable into said housing against the action of said spring, sealing means carried by said housing and engaging said finger to maintain the exterior of said housing in fluid-sealed relation relatively to said second section, a cylinder carried by said plug and extending axially therefrom, a piston reciprocally mounted in said cylinder and having a piston rod, said piston rod having a free end portion projecting axially into said second pipe section through said plug, a spring housed in said cylinder between said piston and said plug and urging said piston and piston rod in a direction outwardly of said second pipe section, sealing means engaging said piston rod within said plug to maintain the interior of said cylinder in fluid-sealed relation relatively to said second pipe section, and means for admitting gas under pressure to the outer end of said cylinder to reciprocate said piston and piston rod in a direction inwardly of said second pipe section, said free end portion of said piston rod being movable into underlying relation with respect to said magazine.

References Cited in the file of this patent

UNITED STATES PATENTS

| | | |
|---|---|---|
| 2,410,037 | Abbott | Oct. 29, 1946 |
| 2,525,261 | Henderson | Oct. 10, 1950 |
| 2,790,500 | Jones | Apr. 30, 1957 |